March 5, 1957 W. N. STILWELL 2,783,571
THREADING DEVICE
Filed Feb. 9, 1953
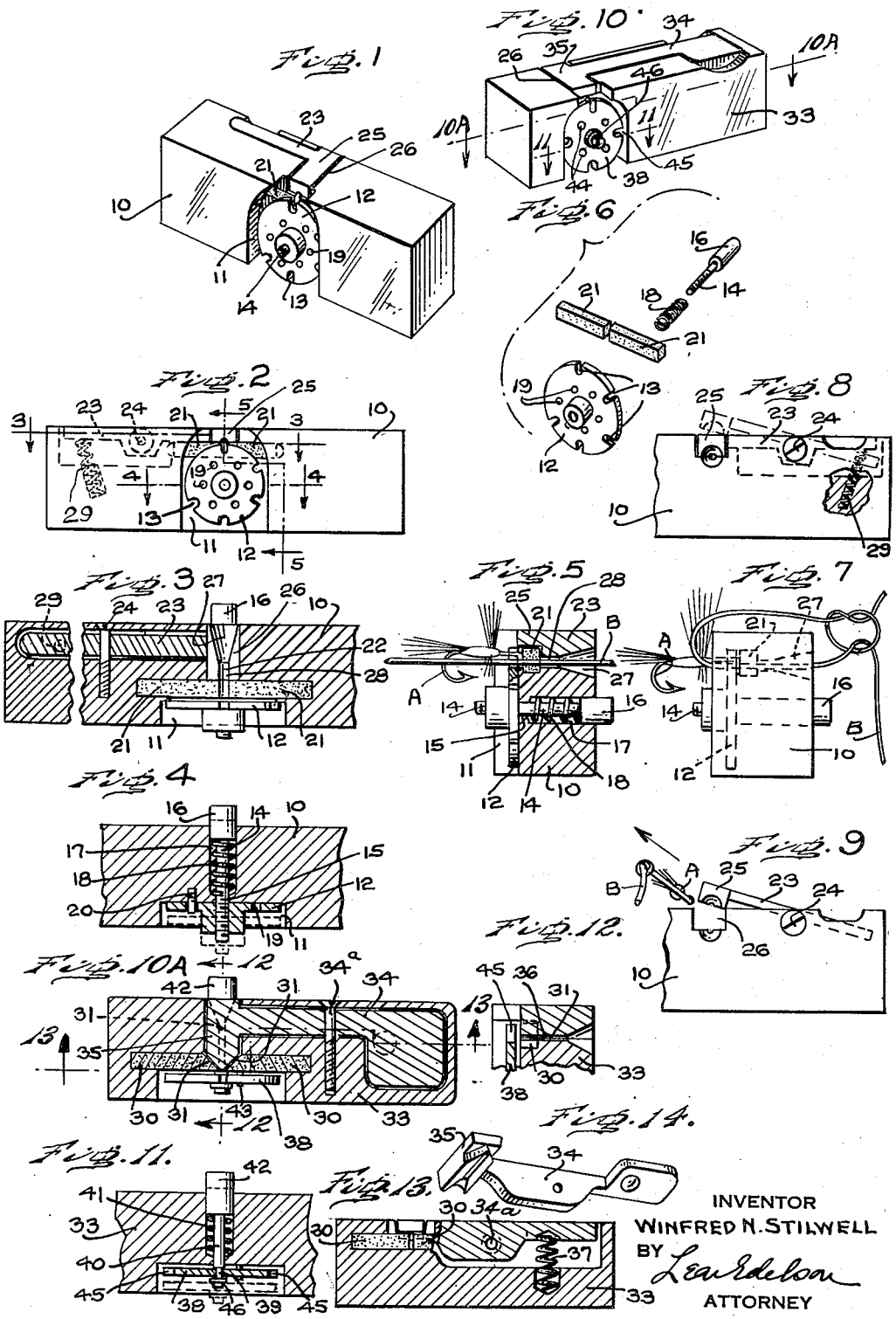
INVENTOR
WINFRED N. STILWELL
BY Lew Edelson
ATTORNEY

United States Patent Office 2,783,571
Patented Mar. 5, 1957

2,783,571

THREADING DEVICE

Winfred N. Stilwell, Radnor, Pa.

Application February 9, 1953, Serial No. 335,917

10 Claims. (Cl. 43—1)

This invention relates generally to devices for threading a strand of yarn through the eye of a hook, needle or other pointed element, and more particularly to a device which is especially designed to facilitate the threading of a line through the eye of a fishing-hook and its securement thereto.

The securement of a fishing line to eyed flies has always presented more or less of a problem to the fisherman, particularly when it becomes necessary to tie a line to a fly hook which is so dressed with feathers or the like that the resulting hackle interferes with easy projection of the gut through the hook eye. Also, the tying of the gut to the hook is in itself a relatively difficult and cumbersome operation, particularly in the case of small flies which are difficult to manually thread and tie.

It is among the principal objects of the present invention to provide a simple, effective and inexpensive device which includes means for magnetically holding the fly hook in position with its eye in exact registry with a guide bore which initially receives the gut and supports and guides it through the hook eye, whereby threading of the eye is effected expeditiously and with certainty.

A further object of the invention is to provide a threading device which supports any one of a number of different sized hook eyes in registry with a supporting guide bore for the line and which facilitates tying of the line to the fly hook.

Still another and important object of the present invention is to provide a device of the character described wherein permanent magnets are employed in such a manner and in such relation to a guide bore for a fishing line to be secured to an eyed fly as to hold the eye of the hook in an exact position to receive the line as it is projected through the guide bore, the latter being designed not only to insure axial registration of the line with and projection thereof through the hook eye, but also to permit instant removal of the hook from the threading device upon securement of the line thereto.

Also among the objects of the present invention is to provide means in the form of a peripherally notched disk which may be indexed about its center to selectively position any one of the notches thereof in registry with the guide bore for the hook line, the several notches being all graded in size to respectively accommodate different sized hook eyes, whereby a selected hook may be located in position to be firmly supported by the holding magnet with the eye of the hook in exact registry with the guide bore for attaching line.

A still further object of the present invention is to provide a guide bore which is longitudinally split to permit removal of the line from the threading device after the line has been projected through the eye of the hook preliminarily to completing the tie, the split bore being so designed and constructed as to have a spring-pressed part which is normally seated in position to maintain the bore intact and complete for facile guiding of the line to and through the magnetically supported hook eye and which may be unseated by simple pressure of a finger of the hand in which the device is held to permit lateral removal of the line from the guiding bore.

Other objects and advantages of the invention will be apparent hereinafter, it being understood that the present invention consists substantially in the combination, construction, location and relative arrangement of parts, all as described in detail hereinafter, as shown in the accompanying drawings and as finally pointed out in the appended claims.

In the accompanying drawings which are illustrative of certain preferred embodiment of the present invention:

Figure 1 is a perspective view of one form of a threading device as constructed in accordance with the principles of the present invention;

Figure 2 is a front elevational view thereof;

Figure 3 is a longitudinal sectional view as taken along the line 3—3 of Figure 2;

Figure 4 is a partial longitudinal sectional view of the device as taken along the line 4—4 of Figure 2;

Figure 5 is a transverse sectional view as taken along the line 5—5 of Figure 2;

Figure 6 is an exploded view in perspective of the magnets, indexing plate and plate mounting elements of the threading device;

Figure 7 is an end elevational view of the device showing an eyed fly threaded with a line and the tying knot partially completed;

Figure 8 is a rear elevational view of the device shown in Figure 1, partially in section and showing the upper element of the guide bore in its normal operative position for guiding the line to and through the eye of the fly;

Figure 9 is a view similar to Figure 8 but showing the upper element of the guide bore in its raised line-releasing position;

Figure 10 is a perspective view of a modified form of the threading device of the present invention;

Figure 10A is a longitudinal sectional view of the modified form as taken along the line 10A—10A of Figure 10;

Figure 11 is a partial sectional view as taken along the line 11—11 of Figure 10;

Figure 12 is a transverse sectional view as taken along the line 12—12 of Figure 10A;

Figure 13 is a sectional view as taken along the line 13—13 of Figure 10A; and

Figure 14 is a perspective view of the pivoted member which forms the upper part of the guide bore and which is operable to release the line and the line-threaded fly from the threading device.

Referring now more particularly to the drawings, it will be noted that Figures 1 and 10 respectively show two different forms of the threading device as constructed in accordance with and embodying the principles of the present invention and which essentially is a unitary organization of such a size and shape that it may be held conveniently in the hand or carried by the user in a pocket of his wearing apparel.

In the form of the device as shown in Figures 1 to 9, inclusive, it generally comprises an elongated main body member 10 of any suitable cross-sectional shape having formed in one face thereof a recess 11 in which is revolubly mounted a disk 12 for insuring placement of the eyed fly in exact position for the eye thereof to be threaded with the line to which the fly is intended to be secured. This disk 12 is provided in its peripheral edge with a plurality of circumferentially spaced open-ended notches 13 which differ in depth and width so that the several notches respectively accommodate hook shanks of different size. It will be understood, of course, that in the use of the device of the present invention, the hook to be threaded is disposed within a selected notch of the proper size with the axis of the eye extending to the central axis of the disk.

The revoluble disk 12 is suitably secured to the forward end of a shaft 14 which extends transversely of the main body member 10 and is suitably journalled therein, as at 15, for rotation about its own longitudinal axis, as is best shown in Figures 4 and 5. The rear end of the shaft 14 is enlarged, as at 16, to form a finger-engaging button which is axially shiftable in a guide bore 17 suitably formed in the body member 10 and which is normally spring-pressed into its rearmost position shown in Figures 4 and 5 by a coiled compression spring 18 which embraces the shaft 14.

The disk 12 is also provided with a plurality of indexing holes 19 equidistantly spaced radially from the center of the disk so that each may be brought into registry with an index pin 20 fixed in the recessed face of the body member 10 (see Figure 4). A separate indexing hole 19 is provided for each peripheral notch 13 formed in the disk, the several holes being so circumferentially spaced relatively to the notches with which they are respectively associated that upon registry of a particular indexing hole with the single index pin 20, the notch associated with said particular indexing hole will be at the top edge of the disk and will be held in fixed position to receive and properly locate the eye of a hook A to be threaded with and tied to the fishing line B.

In order to present any selected one of the different-sized notches 13 of the disk 12 in its proper operative position, it is only necessary to press the button 16 axially against the pressure of the spring 18 to shift the disk 12 axially out of engagement with the indexing pin 20 and then freely rotate it into desired position for registry of a selected indexing hole with the indexing pin, whereupon, upon release of the button 16, the disk assembly is axially spring-pressed into its normal position shown in Figure 4 and in which position it is held against rotation by the index pin engaged therewith.

Of course, the number of the notches 13 in the disk 12 may be varied as desired, and while a corresponding number of indexing holes should be provided as a minimum, one additional indexing hole may be provided as shown to index, if desired, a blank portion of the disk into the position which would normally be occupied by one of the notches 13.

Disposed immediately to the rear of the disk 12 in line with its topmost portion are a pair of longitudinally alined permanent magnets 21—21, each of elongated bar form, there magnets being suitably mounted in the body member 10 with their proximate ends spaced apart a distance not exceeding the inside diameter of the smallest hook eye designed to be threaded by the device of the present invention. Thus, the fixed spacing between the proximate ends of the bar magnets 21—21 should in no instance be greater than the inside diameter of the hook eye which snugly fits the smallest notch 13 of the disk 12. Also, the mounting of the bar magnets 21—21 is such that the space provided between their proximate ends is in exact registry with each of the open-ended notches when each such notch is indexed into a position at the top edge of the disk 12. Preferably, the magnetic elements 21—21 are of the type formed of permanent magnetic alloy material, such as, "Alnico," manufactured and sold by the Crucible Steel Company of America.

Any suitable arrangement may be employed for permanently securing the bar magnets 21—21 in their requisite longitudinally alined, spaced relation, as, for example, by embedding the magnets in suitable recesses formed in the body member 10. The frontal faces of the bar magnets are disposed flush with the surface of the recess 11 and with the proximate ends thereof respectively projecting inwardly of the side edges of any notch 13 brought into registry with the space between the magnets so that upon placement in the notch of a hook eye the latter will overlie the projecting ends of the bar magnets 21—21 and will be magnetically held thereby in secure position. The notched disk 12 is made of nonmagnetic material, such as aluminum, brass or plastic, and so serves only to locate the hook eye in such proper position relatively to the bar magnets that the latter may magnetically hold the hook eye in the exact position required for threading of the line therethrough.

It will be understood, of course, that in lieu of employing a pair of spaced magnets as shown, there may be employed a single bar magnet having suitably formed therein a notch through which the line may be projected and with which a selected notch 13 of the disk 12 may be brought into registry. In such case, as where a pair of spaced bar magnets are employed as shown, the width and depth of the opening formed in the magnet are always such as to insure free passage of the line B axially through the eye of the fly to be tied with the line.

In order to insure axial projection of the line through the eye of the magnetically held fly, and to facilitate removal of the line with its attached fly from the threading device, the main body member 10 thereof is provided with a transversely extending, line-guiding bore 22 which extends rearwardly of the bar magnets 21—21 in axial alinement with the center of the eyed fly magnetically held in position to be threaded. This bore 22 is split lengthwise thereof to form two mating grooves, viz., a lower groove of semi-circular cross-section formed in the body member 10 and an upper groove of complemental semi-circular cross-section formed in a member 23 disposed in a recess suitably formed in the body member 10 and pivotally mounted for rocking movement about a pivot pin 24 extending transversely of the body member.

The member 23 is provided to one side of its pivot pin 24 with a transversely extending head-piece 25 which is undercut along its bottom surface to provide an elongated groove which forms the upper half-section of the line-guiding bore 22. The complemental groove forming the lower half-section of the line-guiding bore 22 is formed in the top surface of a recess 26 which extends transversely across the top of the body member 10, this recess 26 being disposed above and in parallel relation to the axis of rotation of the notched disk 12. The recess 26 snugly accommodates the head-piece 25 of the pivoted member 23 and when said head-piece 25 is pressed firmly into its accommodating recess 26, the complementally formed upper and lower grooves are in exact registry and conjointly form the line-guiding bore (designated 22), which is of circular cross-section throughout its full length. The corresponding outer end portions of the complementally grooved sections of the bore are beveled to conjointly provide a flared entrance 27 to that portion 28 of the guide bore which is of uniform diameter. The inner end of the portion 28 of the line-guiding bore terminates at the rear face of the permanent magnet assembly, the passage through the guide bore 28 being in registry with and constituting a continuation of the passage through the bar magnet assembly.

The pivoted member 23 is normally spring-pressed into its position shown in Figures 1, 2 and 3 by a coiled compression spring 29 suitably set in the body member 10 to exert a biasing effort against the outer end of the member 23 which tends constantly to resiliently seat the head-piece 25 into its accommodating recess 26. It will be apparent that upon depressing the outer end of the member 23 against the force of the spring 29, the head-piece 25 of the pivoted member will be raised, as shown in Figure 9, to separate the two half-sections of the line-guiding bore and thereby permit lateral removal of the line from the bore after it has been threaded through and attached to the eye of the hook. In this connection, it will be noted that the passageway through the magnet assembly is freely open at the top end thereof, as is the fly-locating notch which is in registry with said passageway, so that upon raising the top half-section of the line-guiding bore, the line B is free to be removed from the threading device by lateral shifting of that portion of the line which was extended through the line-guiding bore.

Preferably, the flared portion 27 of the line-guiding bore 22 is only of such axial length as to facilitate feed of the line B into the line-guiding bore 22 and thence to and through the magnet and the eye of the hook magnetically held in registry with the line-guiding bore. It is, however, desirable that the line-guiding bore 22 include a portion, such as the portion 28, which is axially straight and of uniform diameter to insure rectilinear projection of the inner end of the line to and through the eye of the magnetically held fly.

It will be apparent that in operation of the device as just described, the disk 12 is initially rotated to present the notch of requisite size for a fly to be threaded with line into registry with the line-guiding bore and the passageway through the magnet assembly. The eye of the fly A is then seated in the notch and pressed toward the magnet assembly which magnetically holds the fly securely in position with its eye in exact registry with the line-guiding bore. The line B is then projected through the bore, the passageway through the magnet assembly and the eye of the fly, as shown in Figure 5, whereupon the projected end of the line may be looped about the eyed fly and tied thereto by any suitable tying knot, as shown in Figure 7. However, before the knot is drawn tight, the spring-pressed member 23 is finger-actuated to raise the grooved head-piece 25 thereof from its accommodating recess 26 to permit lateral withdrawal of the looped portion of the line from the threading unit, whereupon the knot may be tightened to complete the tie with the fly.

Figures 10 to 14, inclusive, show a modified construction of the threading device of the present invention. In this modified construction, the proximate ends of the spaced bar magnets 30—30 are respectively beveled, as at 31—31, to reduce to a minimum the length of the restricted passage therebetween measured axially of the line-guiding bore 32 extending through the body member 33 of the unit.

As in the previously described form of the invention, the modified construction also includes a spring-pressed member 34, which is pivoted, as at 34ª, to the body member 33. This pivoted member is, however, provided with a transversely extending head-piece 35 which is undercut and grooved, as best shown in Figure 14, to permit extension of the straight line portion 36 of the line-guiding bore to a point substantially coincident with the frontal surface of the magnet assembly, in consequence of which the forward end of the line-guiding bore is practically contiguous to the eye of the fly which is magnetically held in place to be threaded with line. It will be understood, of course, that the upper and lower half-sections of the line-guiding bore are complementally formed to snugly fit in the recess formed between the beveled ends 31—31 of the bar magnets, and that the coiled compression spring 37 operates normally to bias the headpiece 35 into position to provide a line-guiding bore of circular cross-section throughout its full length.

In the modified form of the unit, the notched disk 38 is mounted for rotation upon the outer reduced diameter end 39 of the shaft 40 which extends transversely through the body member 33 and is axially spring-pressed, as will be understood, under the influence of a coiled compression spring 41. The shaft 40 is provided, as in the previously described unit, with an actuating button 42 for shifting the disk out of locking engagement with its index pin 43, as when it is desired to rotate the disk to effect interengagement of the index pin with any one of the indexing holes 44 for location of a preselected notch 45 in its operative position relatively to the line-guiding bore and the fly-holding magnets. Any suitable means may be employed for securing the disk 38 rotatably upon the reduced diameter end 39 of the shaft 40, as, for example, by a cap nut 46 threaded upon the end of the shaft.

In all forms of the invention wherein a permanent magnet assembly is employed as shown and described for supporting the eyed element in fixed position relatively to the line-guiding bore, it is, of course, preferable to mount such assembly in a member, such as 10 of Figure 1, which is constructed of nonmagnetic material, as, for example, aluminum or other nonferrous metal or a suitable plastic composition. The pivoted member, such as 23 of Figure 1 and 34 of Figure 10, is similarly formed of nonmagnetic material, as are all parts of the device which are located in close association with the bar magnets, thereby insuring against the formation of stray magnetic fields which might reduce the strength of the magnetic attraction of the bar magnets for the eyed element supported thereby. Any suitable arrangement may be employed for securely mounting the magnet assembly in the nonmagnetic supporting body to insure maximum effective strength of the magnet.

In certain instances, it may be desirable to dispense with the permanent magnet means for support of the eyed element, it being within the contemplation of the present invention to utilize the notched disk not only to accurately locate the eyed element in fixed position to be threaded with a line projected through the line-guiding bore, but also to support the element in said fixed position. In such case, the open-ended notches formed in the peripheral edge of the disk would be suitably formed to snugly and firmly seat the eye of the element in position with its axis coincident with that of the line-guiding bore, as by grooving the opposite side edges of each bore so that upon a slipping the eye into the notch it is snugly received and frictionally retained therein.

It will be apparent that the device of the present invention is applicable for the threading of eyed elements other than fishing flies, as, for example, needles and awls having small diameter yarn or thread-receiving eyes, and accordingly, it will be understood that the device is not necessarily limited in its use to eyed flies and the like.

Also, it will be understood, of course, that the present invention is susceptible of various changes and modifications which may be made from time to time without departing from the general spirit or real principle thereof, and it is accordingly intended to claim the same broadly, as well as specifically, as indicated by the appended claims.

What is claimed as new and useful is:

1. In a threading device of the character described, a main body assembly having a line-guiding bore extending transversely therethrough, magnetic means disposed at one end of said bore for magnetically supporting an eyed element in position with its eye to be threaded in axial registry with said bore, said magnetic means having a passage formed therethrough in continuation of the passage through said guide bore, and means disposed in close proximity to said magnetic means for locating the eye of the magnetically supported element in position to be attracted by said magnetic means and supported thereby with the eye of the element in axial alinement with said guide bore, said locating means including a rotatable disk having a plurality of peripheral notches of different sizes formed therein adapted to be selectively disposed in said eye-locating position.

2. In a threading device of the character described, a main body assembly having a line-guiding bore extending transversely therethrough, magnetic means disposed at one end of said bore for magnetically supporting an eyed element in position with its eye to be threaded in axial registry with said bore, said magnetic means having a passage formed therethrough in continuation of the passage through said guide bore, and means disposed in close proximity to said magnetic supporting means for locating the eye of the magnetically supported element in position to be attracted by said magnetic means and supported thereby with the eye of the element in axial alinement with said guide bore, said locating means including a member having an open-ended notch formed therein disposed in registry with said bore.

3. In a threading device of the character described, a main body assembly having a line-guiding bore extending transversely therethrough, magnetic means disposed at one end of said bore for magnetically supporting an eyed element in position with its eye to be threaded in axial registry with said bore, said magnetic means having a passage formed therethrough in continuation of the passage through said guide bore, and means disposed in close proximity to said magnetic supporting means for locating the eye of the magnetically supported element in position to be attracted by said magnetic means and supported thereby with the eye of the element in axial alinement with said guide bore, said locating means including a member having an open-ended notch formed therein disposed in registry with said bore and means for longitudinally splitting said bore to facilitate lateral removal of the line after it has been threaded through the eyed element.

4. In a device for threading a length of line through the aperture of an eyed element, such as an eyed fly or the like, a main body assembly having a line-guiding bore extending transversely therethrough, a permanent magnet assembly disposed at the outer end of said bore and having a passage therethrough in axial continuation of said bore, said passage being adapted to be laterally opened to permit lateral removal of a line from said magnet assembly, means mounted on said body for locating an eyed element relatively to said magnet assembly for magnetic retention of the eye of the element in such a position that its aperture is in axial registry with the line-guiding bore, and means for splitting the line-guiding bore lengthwise thereof to permit lateral removal of the line from the bore and the magnet assembly.

5. In a device of the character defined in claim 4 wherein said locating means for the element includes a member having an open-ended notch adapted to be presented in registry with the passage through said magnet assembly, the open end of said notch being positioned to face in the same direction as the lateral opening of said passage.

6. In a device of the character defined in claim 4 wherein said locating means includes a revoluble disk rotatable about an axis spaced from but paralleling that of said line-guiding bore, said disk being provided in its peripheral edge with a plurality of circumferentially spaced open-ended notches of respectively different size, any one of which notches may be selectively alined with the line-guiding bore and the passage through said magnet assembly.

7. In a device of the character defined in claim 4 wherein said locating means includes a revoluble disk rotatable about an axis spaced from but paralleling that of said line-guiding bore, said disk being provided in its peripheral edge with a plurality of circumferentially spaced open-ended notches of respectively different size, any one of which notches may be selectively alined with the line-guiding bore and the passage through said magnet assembly, and wherein indexing means are provided for locking the disk in a fixed position with the selected notch in operative alinement with the line-guiding bore.

8. In a threading device of the character defined in claim 4 wherein the line-receiving end of said bore is provided with a tapered entrance way leading to a straight bore section of uniform diameter.

9. In a threading device of the character described, a main body assembly in which is formed a transversely extending line-guiding bore having at one end thereof a flared entrance way, said bore being partially formed in a member of said assembly that is movable for splitting said bore along its length, and means disposed at the opposite end of said bore for supporting an eyed element in position with the eye thereof in axial registry with said bore including a revoluble disk in the peripheral edge of which is formed a plurality of open-ended notches of different sizes adapted to be selectively disposed in axial registry with said bore.

10. In a threading device of the character described, a main body assembly having a line-guiding bore extending transversely therethrough, magnetic means disposed at one end of said bore for magnetically supporting an eyed element to be threaded with its eye in axial registry with said bore, said magnetic means being provided with a passageway in registry with said bore, means disposed in close proximity to said magnetic supporting means for locating the eye of the magnetically supported element in axial registry with said line-guiding bore, the latter being formed by a pair of complementary registering grooves provided respectively in the meeting surfaces of a pair of selectively movable parts one of which is a main body member and the other a member fitted into and pivotally secured to said main body member, and a compression spring operating against a finger-engaging part of said pivoted member and so disposed to one side of its pivot that upon depression of said finger-engaging part the grooved part of the pivoted member is lifted from the complementally grooved main body part to thereby split said lever-guiding bore lengthwise thereof.

References Cited in the file of this patent
UNITED STATES PATENTS

| | | |
|---|---|---|
| 242,288 | Farrell | May 31, 1881 |
| 606,269 | Bowman | June 28, 1898 |
| 1,100,486 | Merliss | June 16, 1914 |
| 2,107,645 | Parkhurst | Feb. 8, 1938 |
| 2,596,214 | Corkran | May 13, 1952 |
| 2,670,563 | Anderson | Mar. 2, 1954 |
| 2,682,126 | Shepherd | June 29, 1954 |